(12) United States Patent
Buckles et al.

(10) Patent No.: US 7,627,000 B2
(45) Date of Patent: Dec. 1, 2009

(54) USING AN EXTERNAL ROUTER TO MANAGE FOREIGN DATA COMMUNICATION CHANNEL TRAFFIC

(75) Inventors: Carl Nathan Buckles, McKinney, TX (US); Michael W. Truskowski, Ladue, MO (US)

(73) Assignee: Cisco Technology, Inc., San Jose, CA (US)

( * ) Notice: Subject to any disclaimer, the term of this patent is extended or adjusted under 35 U.S.C. 154(b) by 982 days.

(21) Appl. No.: 10/933,004

(22) Filed: Sep. 1, 2004

(65) Prior Publication Data
US 2006/0045104 A1 Mar. 2, 2006

(51) Int. Cl.
*H04J 3/16* (2006.01)
*H04J 3/22* (2006.01)

(52) U.S. Cl. .................... 370/466; 370/465; 370/467

(58) Field of Classification Search ................ 370/405, 370/406, 407, 389, 469, 395.51, 391, 392, 370/437, 474, 524, 532, 535, 537, 538, 395.52, 370/401, 360, 465–468
See application file for complete search history.

(56) References Cited

U.S. PATENT DOCUMENTS

| 5,430,727 A * | 7/1995 | Callon ..................... 370/401 |
| 5,781,535 A * | 7/1998 | Russ et al. ................ 370/248 |
| 6,584,102 B1 | 6/2003 | Lu |
| 6,721,321 B1 | 4/2004 | Song |
| 6,731,632 B1 * | 5/2004 | Takahashi et al. ............ 370/392 |
| 6,778,541 B2 * | 8/2004 | Houston et al. ............. 370/401 |
| 6,856,620 B1 * | 2/2005 | Dunsmore et al. ........... 370/389 |
| 6,888,798 B2 * | 5/2005 | Jamieson et al. ............ 370/236 |
| 2003/0031125 A1 | 2/2003 | Oyamada |
| 2003/0070007 A1 * | 4/2003 | Tchakmakjian ............. 709/330 |
| 2004/0013137 A1 | 1/2004 | Lohr |
| 2004/0088735 A1 | 5/2004 | Kristofek |
| 2004/0136389 A1 * | 7/2004 | Hunneyball ................. 370/406 |

OTHER PUBLICATIONS

"IP over Data Communication Channel (DCC)", Cisco IOS Release 12.0SP. pp. 1-21.

* cited by examiner

*Primary Examiner*—Ayaz R Sheikh
*Assistant Examiner*—Chuong T Ho
(74) *Attorney, Agent, or Firm*—Edell, Shapiro & Finnan, LLC

(57) ABSTRACT

Methods and apparatus for efficiently managing third-party data communication channel (DCC) channels using an optical network element without an OSI stack in conjunction with an external router are disclosed. According to one aspect of the present invention, a gateway network element includes a first port that receives a signal from a network element having a stack associated with a first protocol. The signal includes information contained in a DCC channel. The gateway network element also includes a retrieving mechanism that extracts the information contained in the DCC channel, a second port that supports a point-to-point-over-Ethernet (PP-PoE) session with an external router, and a sending mechanism that send the extracted information using the second port through the use of a second protocol.

24 Claims, 8 Drawing Sheets

USING AN EXTERNAL ROUTER TO MANAGE FOREIGN DATA COMMUNICATION CHANNEL TRAFFIC

BACKGROUND OF THE INVENTION

1. Field of Invention

The present invention relates generally to network systems. More particularly, the present invention relates to enabling a gateway network element which does not include an Open Systems Interconnection (OSI) stack to cooperate with a router to manage data communication channel (DCC).

2. Description of the Related Art

The demand for data communication services is growing at an explosive rate. Much of the increased demand is due to the fact that more residential and business computer users are becoming connected to the Internet. To address the demand for data communication services, the use of optical networks, such as a synchronous digital hierarchy (SDH) network or a synchronous optical network (SONET), is becoming more prevalent.

Emerging SDH and SONET standards generally require that gateway network elements within overall networks be able to terminate and to process embedded operation channels. Such embedded operation channels are typically transmitted over data communication channel (DCC) bytes in SONET overhead or, more generally, bandwidth for management information within a signal. Management information is typically extracted from the signal, e.g., information in embedded operations channels is extracted from DCC bytes, by protocol stacks associated with network elements.

Many types of network elements are typically available. Such network elements include, but are not limited to, network elements which support Open Systems Interconnection (OSI) stacks and network elements which support IP-based stacks. As will be appreciated by those skilled in the art, a stack is generally a set of protocol layers, e.g., a stack that is based on an OSI model includes seven protocol layers. Network elements generally include gateway network elements, which are effectively nodes that receive signals or messages from one node and forward the signals or messages to a customer management network.

A gateway network element with an OSI stack is generally arranged to be in communication with network elements and customer networks which send and receive OSI-complaint signals. FIG. 1 is a diagrammatic representation of a gateway network element with an OSI stack in communication with a customer network and other network elements which each have an OSI stack. A gateway network element 104 with an OSI stack is arranged to receive signals from network elements 108 with OSI stacks. When gateway network element 104 receives a signal from a network element 108, gateway network element 104 either forwards the signal to a customer network 112 or to another network element 108, e.g., a signal received by gateway network element 104 from network element 108a may be forwarded to network element 108b and vice versa.

Gateway network elements which have IP or IP-based stacks are generally arranged to be in communication with network elements and customer networks which send and receive IP-complaint signals. FIG. 2 is a diagrammatic representation of a gateway network element with an IP stack in communication with a customer network and other network elements which have IP stacks. A gateway network element 204 with an IP stack is arranged to receive signals from network elements 208 with IP stacks. Gateway network element 204 may receive a signal from either network element 208a or network element 208b, and forward the signal to network element 208b or network element 208a, respectively, as appropriate. Gateway network element 204 may also forward the signal from network elements 208 to a customer network 212.

Typically, network elements which support OSI stacks and network elements which support IP-based stacks or, more generally, do not support OSI stacks, are not interoperable. That is, network elements which support OSI stacks generally are not compatible with network elements which do not support OSI stacks. When an overall network system is to utilize both network elements with OSI stacks and network elements without stacks, the network is effectively designed to include multiple networks, i.e., a sub-network which includes network elements with OSI stacks and a sub-network which includes network elements without OSI stacks. With reference to FIG. 3, an overall network which includes both network elements with OSI stacks and network elements without OSI stacks will be described. Network elements 306, 310 with OSI stacks are connected to each other, and to a customer network 312. Network elements 316, 320, which do not have OSI stacks, are also connected to each other and to customer network 312.

Network elements 306, 310 are not in communication with network elements 316, 320. Network elements 306, 310 communicate with each other and with customer network 312 through dedicated pipes 330, while network elements 316, 320 communicate with each other and with customer network 312 through dedicated pipes 340. Typically, pipes 330 are arranged to carry optical signals which are OSI-complaint, while pipes 340 are arranged to carry optical signals which are not OSI-compliant. Hence, network elements 306, 310 are effectively in a sub-network that supports OSI-complaint signals, while network elements 316, 320 are effectively in a sub-network that supports signals that are not OSI-compliant.

Essentially maintaining separate networks which support different types of signals within an overall network is difficult, as the management of separate networks is often both time-consuming and expensive. When separate networks are maintained, the separate networks are not readily scalable. In addition, redundancy often must be maintained for each network, which further adds to the expense associated with the maintenance of separate networks within an overall network.

Generally, a network element that does not include an OSI stack may not be easily updated to accept OSI-complaint signals. Although the network element that does not include an OSI stack may be altered such that OSI protocols may be terminated within the network element, many developers are unable to develop and to test protocol stacks which would be required to enable OSI protocols to be terminated, and effectively replaced by other protocols. Many developers may not possess the expertise needed, or the time required, to develop and to test protocol stacks that are necessary to terminate OSI protocols within a network element.

Therefore, what is needed is a system which allows an overall network to support OSI-compliant traffic and non-OSI-compliant traffic without requiring that separate networks within the overall network be maintained, and without requiring that a developer modify a network element to terminate OSI protocols when necessary. Specifically, what is needed is a system which effectively allows a gateway network element that does not include an OSI stack to effectively transmit management information contained in DCC channels over a single, shared Ethernet bus to a customer network.

SUMMARY OF THE INVENTION

The present invention relates to using an external router in conjunction with an optical network element without an Open Systems Interconnection (OSI) stack to process embedded operations channels which are transmitted over data communication channel (DCC) bytes from network elements with OSI stacks to the optical network element without an OSI stack. According to one aspect of the present invention, a gateway network element includes a first port that receives a signal from a network element having a stack associated with a first protocol. The signal includes information contained in a DCC channel. The gateway network element also includes a retrieving mechanism that extracts the information contained in the DCC channel, a second port that supports a point-to-point-over-Ethernet (PPPoE) session with an external router, and a sending mechanism that send the extracted information using the second port through the use of a second protocol.

In one embodiment, the gateway network element also includes a terminating mechanism that terminates the DCC channel. In another embodiment, the first protocol is an OSI protocol and the second protocol is an IP-based protocol.

A gateway network element which does not include an OSI stack yet is effectively capable of managing information in DCC channels associated with signals received from network elements with OSI stacks and provides interoperability that enables overall networks to be more scaleable. Using a router placed within a receiving customer network in conjunction with a gateway network element that essentially transmits independent DCC channels using a PPPoE session on a single shared Ethernet bus to the router allows the DCC channels to be managed. Hence, OSI-complaint messages may be forwarded through a gateway network element that does not have an OSI stack to a receiving network.

According to another aspect of the present invention, a router that is arranged to receive a signal with an OSI message within which a DCC channel has been terminated includes a port that is engaged in a point-to-point-over-Ethernet (PPPOE) session during which the signal with the OSI message within which the DCC channel has been terminated is received, and a message processor. The message processor processes the OSI message within which the DCC channel has been terminated. In one embodiment, the message processor is further arranged to terminate portions of the signal.

In accordance with yet another aspect of the present invention, a method for processing an optical signal received from an optical network element with an OSI stack includes receiving the signal. The signal includes a DCC channel which contains an encapsulated message that includes information. The method also includes extracting the information from the encapsulated message, and sending the information, as for example to an external router, using a point-to-point-over-Ethernet (PPPoE) session. In one embodiment, the encapsulated message is a link access protocol on a D channel (LAPD) encapsulated message, and the message also includes terminating the LAPD and sending the signal without the LAPD using the PPPoE session.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Figure 1:
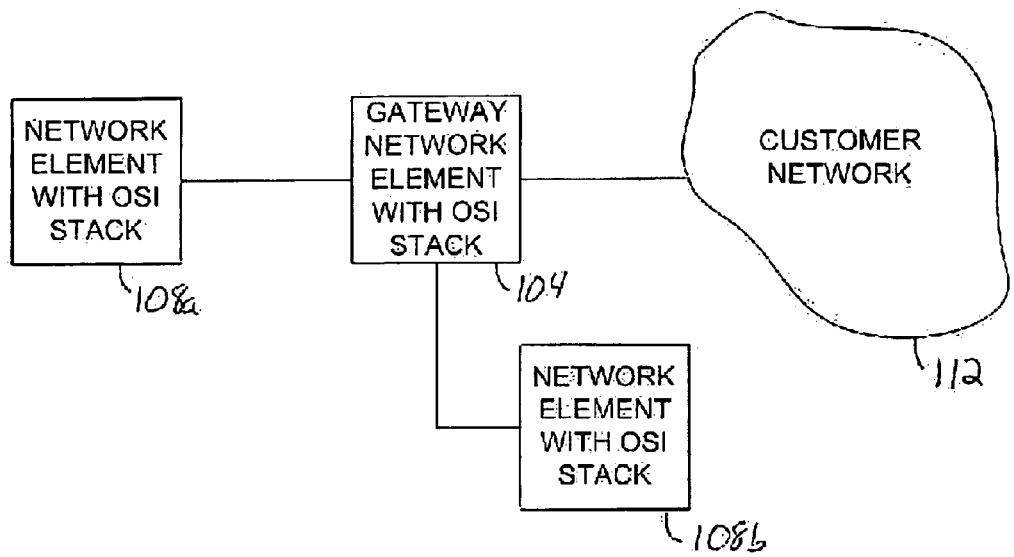
FIG. 1 is a diagrammatic representation of a gateway network element with an Open Systems Interconnection (OSI) stack in communication with a customer network and other network elements which each have an OSI stack.
Figure 2:
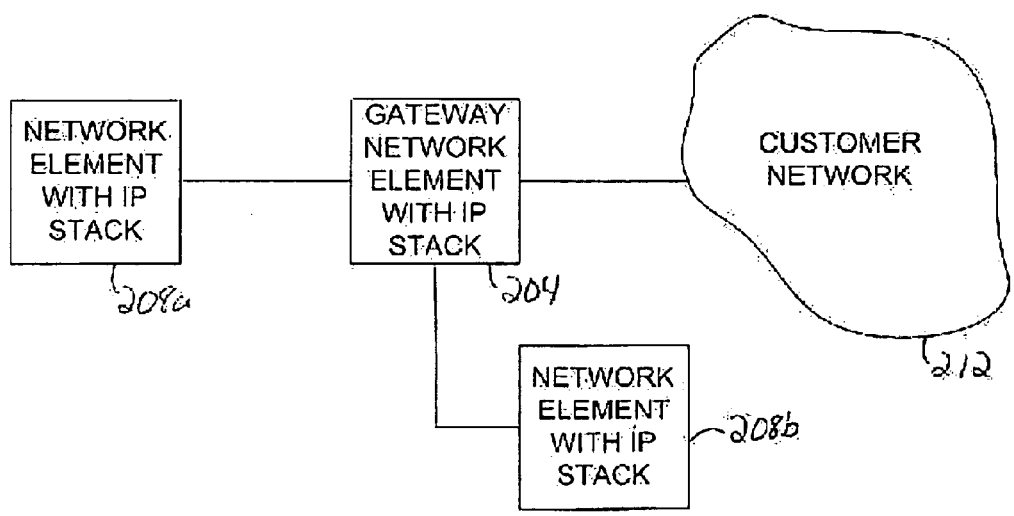
FIG. 2 is a diagrammatic representation of a gateway network element with an IP stack in communication with a customer network and other network elements which have IP stacks.
Figure 3:
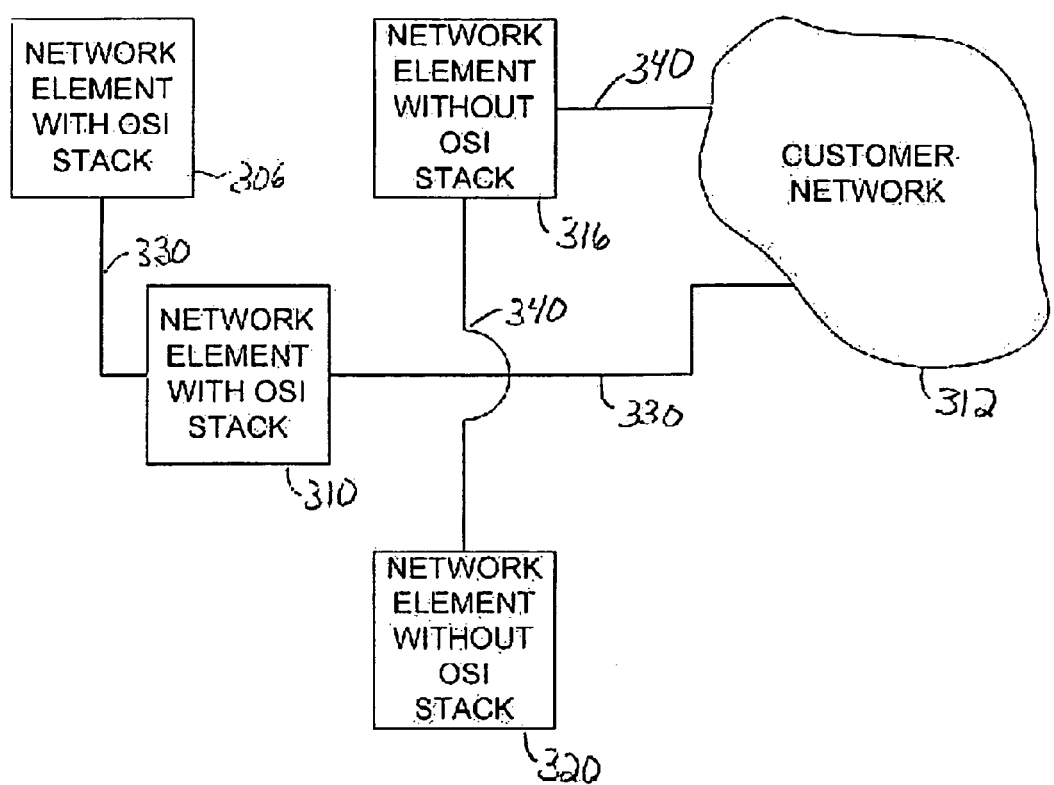
FIG. 3 is a diagrammatic representation of an overall network which includes network elements with OSI stacks and network elements without OSI stacks.

The ability to intermingle optical network elements which support Open Systems Interconnection (OSI) stacks and optical network elements which do not support OSI stacks increases the interoperability associated with network systems. Often, the inability for network elements which do not support OSI stacks to extract management information contained in data communication channel (DCC) channels of OSI-compliant signals prevents such network elements from being used in a portion of a network with network elements which support OSI stacks. Although a gateway network element that does not include an OSI stack may be altered such that OSI protocols may be terminated within the gateway network element, the time and the expertise needed to develop and to test protocol stacks which would be required to enable OSI protocols to be terminated and effectively replaced by other protocols is often unavailable. Hence, modifying a gateway network element without an OSI stack to enable it to extract management information is often impractical.

Within a portion of an overall network which includes network elements which have OSI stacks, by utilizing a router in conjunction with a gateway network element that does not have an OSI stack, the overall element formed by the router and the gateway network element may support OSI traffic. Specifically, the initiation of a point-to-point-over-Ethernet (PPPoE) session between the gateway network element and the router enables management information to be extracted from DCC channels of a signal sent by a network element which has an OSI stack and effectively forwarded through the gateway network element via the router through a customer network. Hence, the ability to manage DCC channels using a gateway network element without an OSI stack may be achieved substantially without the need to significantly alter the protocol stacks associated with the gateway network element. However, protocol development for both a Link Access Protocol on the D channel (LAPD) and PPPoE may be performed, although protocol development for other areas such as CLNS, TP4, TARP, ESIS, ISIS, and FTAM may not be needed. In general, using an existing router that is known to be interoperable with OSI network elements reduces the amount of time and money that is generally needed to perform interoperability testing and trouble-shooting.

When a router that is external to a gateway network element without an OSI stack, i.e., an external router, is positioned within a customer network, the external router and the gateway network element which is connected to the router effectively form an overall element which is suitable for processing and forwarding information from the DCC channel of a signal sent by a third-party network element with an OSI stack. The gateway network element extracts management information from DCC bytes in DCC channels, and terminates the "layer 2" protocol LAPD as necessary, then effectively transmits the management information associated with each DCC channel over a single shared Ethernet bus to the external router using PPPoE sessions. The PPPoE sessions enable the external router to effectively treat each DCC channel as a distinct serial bus rather than as a shared Ethernet bus. The external router is arranged to forward the management information to a management system associated with the customer network.

Figure 4:
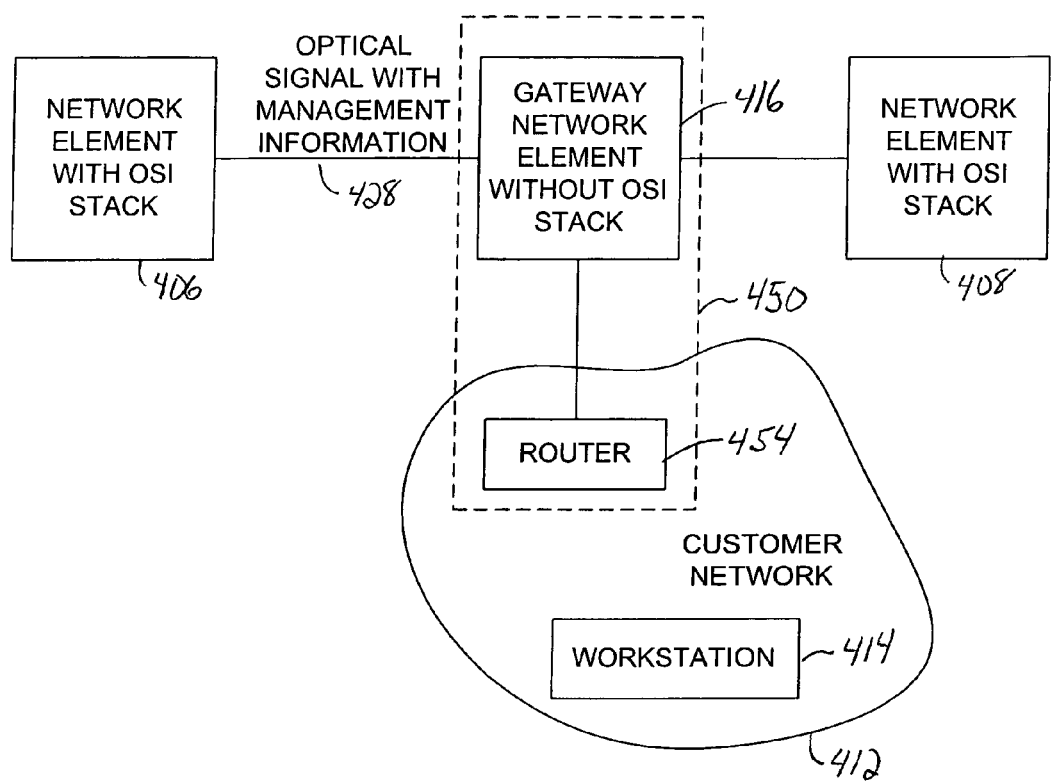
FIG. 4 is a diagrammatic representation of an external router and a gateway network router without an OSI stack within an overall network in accordance with an embodiment of the present invention.

Referring next to FIG. 4, the use of an external router and a gateway network element without an OSI stack into a network system which supports network elements with OSI stacks will be described in accordance with an embodiment of the present invention. A gateway network element 416 which does not have an OSI stack is in communication with an external router 454 that is located within a customer network 412. Together, gateway network element 416 and external router 454 effectively make up an element 450 which allows information contained within an optical signal 428 with management information to be passed into customer network 412 and, potentially, to a workstation 414 within customer network 412 that is in communication with element 450. In one embodiment, workstation 414 is associated with a customer management system which is used to manage customer network 412.

Optical signal 428 with management information is sent by a network element 406 which has an OSI stack to gateway network element 416. The management information is generally contained in embedded operation channels that are transmitted over DCC bytes. Gateway network element 416 may be arranged to pass optical signal 428 to another network element 406 which has an OSI stack. Or, when optical signal 428 is to be provided to an element within customer network 412, gateway network element 416 may generally process information in optical signal 418, and forward the information to router 454. Hence, router 454 functions in cooperation with gateway network element 416 to effectively enable element 450 to process optical signal 428 to enable the management information transmitted over DCC bytes by network element 406 to be provided to customer network 412, even though gateway network element 416 does not have an OSI stack.

Figure 5:
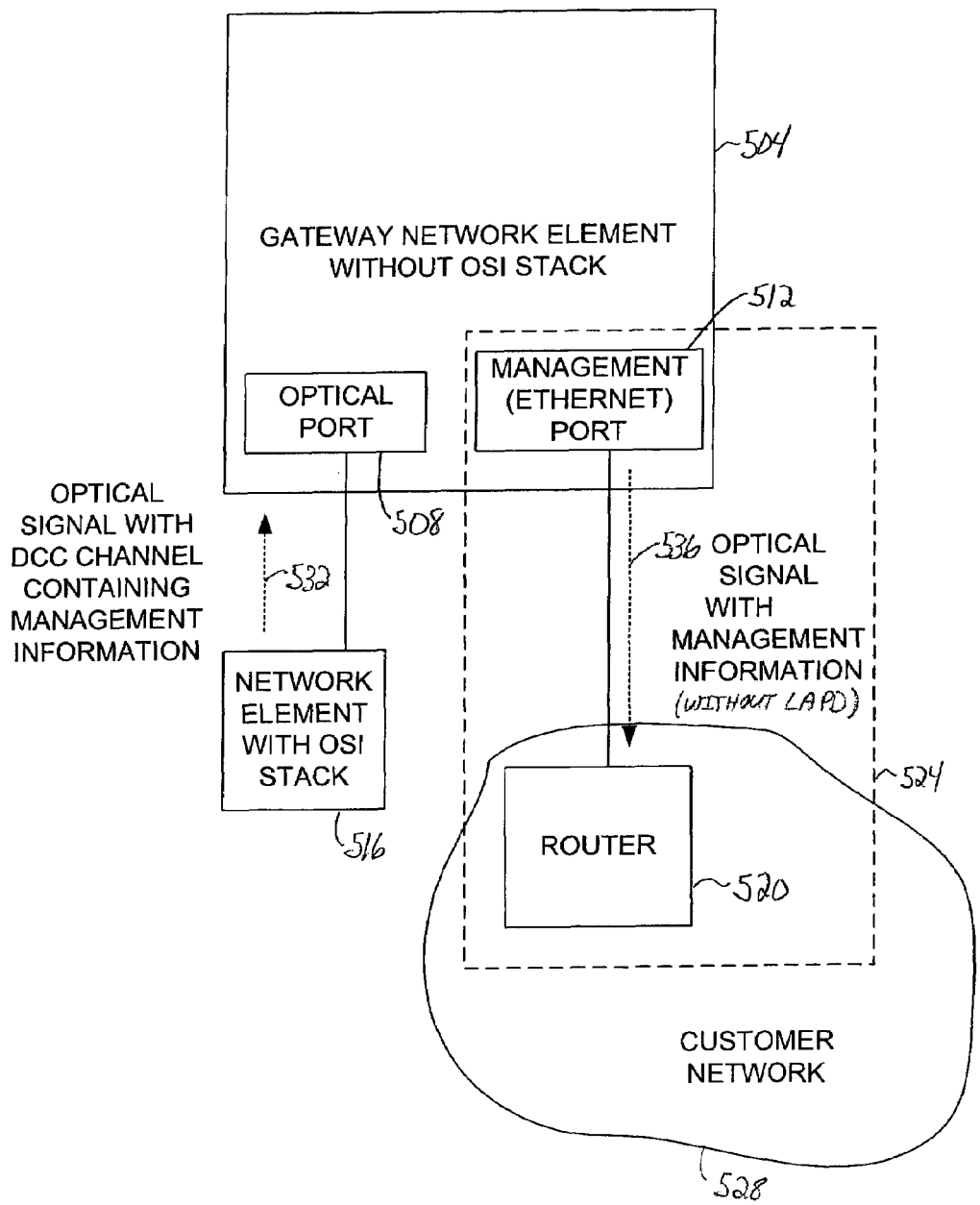
FIG. 5 is a diagrammatic block diagram representation of how an optical signal passes into a network element without an OSI stack in accordance with an embodiment of the present invention.

With reference to FIG. 5, the functionality of an external router and a gateway network element without an OSI stack will be described in more detail. FIG. 5 is a diagrammatic block diagram representation of how an optical signal which includes management information passes into a network element without an OSI stack in accordance with an embodiment of the present invention. A network element 516 which has an OSI stack is in communication with a gateway network element 504 without an OSI stack through an optical port 508 on gateway network element 504. Network element 516 may send an optical signal 532 with a DCC channel that contains management information in embedded operations channels. In one embodiment, the management information is in an LAPD encapsulated message within the DCC channel.

Gateway network element 504 is also in communication with a customer network 528. Specifically, gateway network element 504 is in communication with an external router 520 that is positioned within customer network 528. Gateway network element 504 and router 520 communicate via a PPPoE session. The PPPoE session enables external router 520 to effectively process DCC channels of an optical signal as a substantially distinct serial bus rather than as a shared Ethernet bus.

Gateway network element 504 processes optical signal 532 and effectively terminates the LAPD. Typically, terminating the LAPD involves extracting management information from an LAPD encapsulated message that is included in a DCC channel of optical signal 532. An optical signal 536 with management information, but without an LAPD, is sent from a management port 512 such as an Ethernet port to external router 520 over a PPPoE session.

Figure 6:
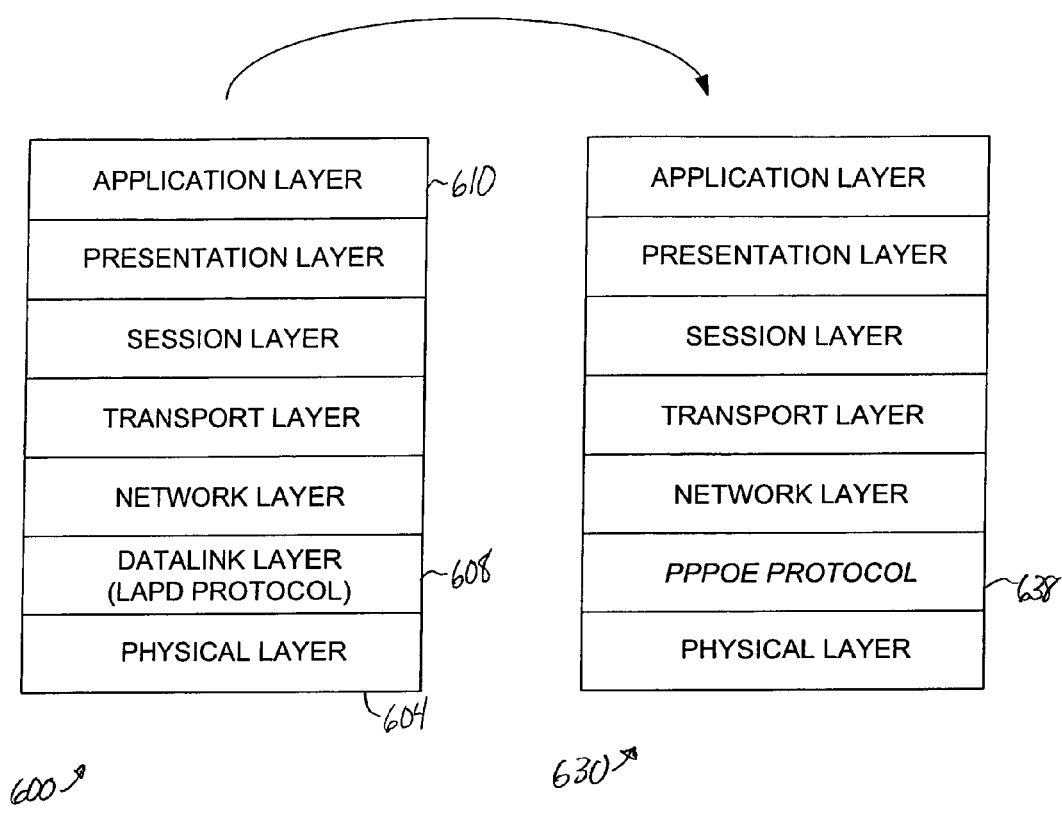
FIG. 6 is diagrammatic representation of a standard stack associated with an OSI model and a protocol stack associated with an OSI model in which a point-to-point-over-Ethernet (PPPoE) protocol replaces a LAPD protocol in a second layer in accordance with an embodiment of the present invention.

FIG. 6 is diagrammatic representation of a standard stack associated with an OSI model and a protocol stack associated with an OSI model in which a PPPoE protocol replaces a LAPD protocol in a second layer in accordance with an embodiment of the present invention. Typically, a protocol stack 600 on a network element such as gateway network element 504 of FIG. 5 processes data, as for example data received by the network element to be forwarded to an external router, by passing packets from a physical layer 604, or "layer 1", to a datalink layer 608, or "layer 2", which has an LAPD protocol, as will be appreciated by those skilled in the art. Eventually, a packet is passed up successive layers of protocol stack 600 to an application layer 610.

When a network element does not have an OSI stack, the network element may effectively have a stack 630 which includes a "layer 2" 638 which uses a PPPoE protocol. Hence, when the network element without an OSI stack receives an OSI-compliant data signal which includes packets and forwards the packets to an external router, the packets pass through protocol stack 630 and, hence, a "layer 2" 538 which uses a PPPoE protocol which allows the originally OSI-compliant data signal to forwarded without LAPD.

Figure 7:
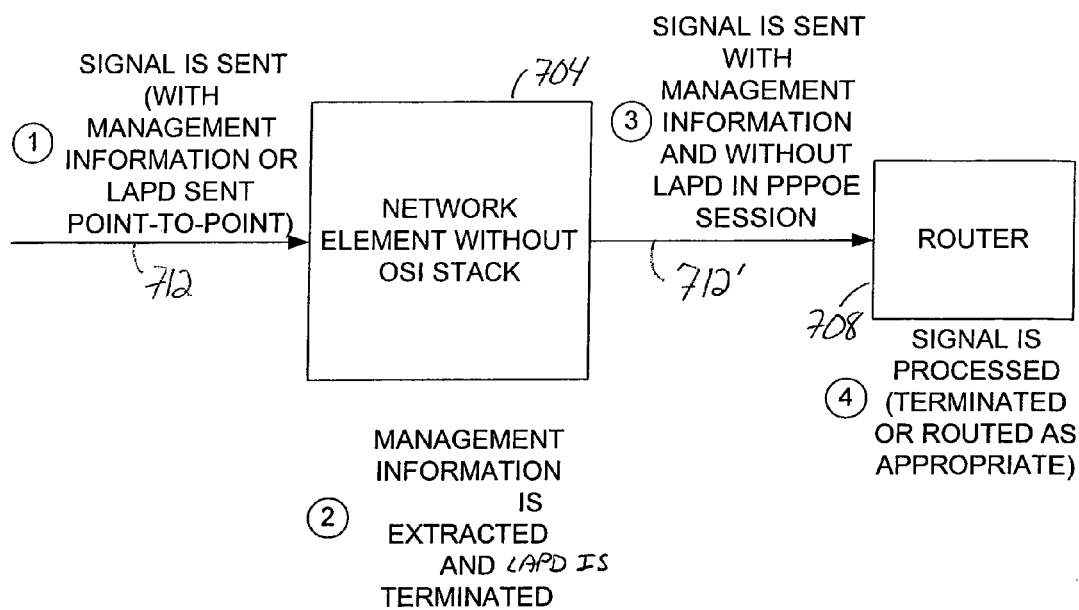
FIG. 7 is a diagrammatic representation of a path followed by a signal that is initially OSI-compliant through a gateway network element without an OSI stack to an external router in accordance with an embodiment of the present invention.

Referring next to FIG. 7, the path of a signal that is initially ISO-complaint through a network element, e.g., a gateway network element, without an OSI stack to an external router will be described in accordance with an embodiment of the present invention. A signal 712 which includes management information or an LAPD is sent on a point-to-point connection from a network element with an OSI stack (not shown) to a network element 704 that does not have an OSI stack. Network element 704 is arranged to extract management information from signal 712, and to terminate the LAPD as appropriate. In one embodiment, the management information in signal 712 is encapsulated within the LAPD. Signal 712 may include an LAPD protocol message that is terminated by network element 704. Alternatively, signal 712 may include a higher level protocol message that has an LAPD portion of the message terminated by network element 704, while the rest of signal 712 is provided to a PPPoE stack associated with network element 704.

A signal 712', which is effectively signal 712 with management information but without LAPD, is forwarded out of network element 704 in a PPPoE session to a router 708. When router 708 receives signal 712', router 708 processes signal 712'. Processing signal 712' generally includes terminating messages and routing messages as appropriate based on a dynamic routing protocol.

Figure 8:
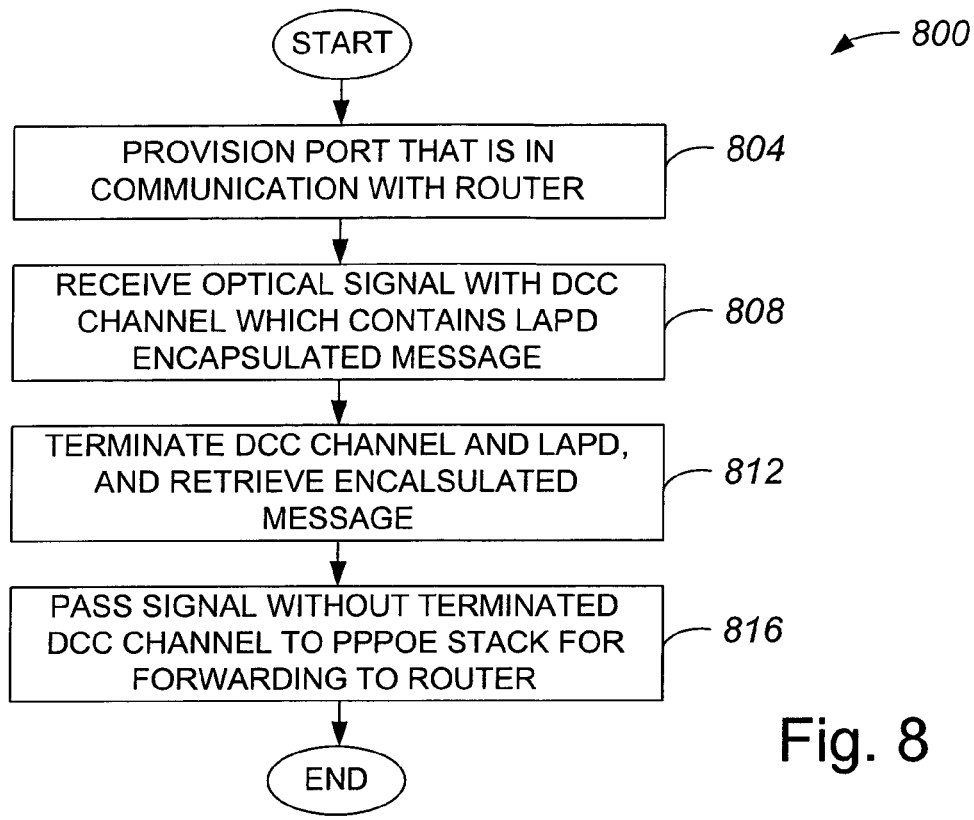
FIG. 8 is a process flow diagram which illustrates steps associated with the operation of a gateway network element without an OSI stack in accordance with an embodiment of the present invention.

With reference to FIG. 8, the steps associated with the operation of a network element, e.g., a gateway network element, without an OSI stack in accordance with an embodiment of the present invention. A process 800 of operating a network element that does not have an OSI stack begins at step 804 in which a port that is in communication with an external router is provisioned. Typically, the port is provisioned to send and to receive OSI messages within a PPPoE session. In one embodiment, a customer may request an OSI function on the network element, and specify which port in the network element is to be used to send and to receive OSI messages. Once the port is provisioned, an optical signal with a DCC channel is received in step 808. The DCC channel contains an LAPD encapsulated message, or, more generally, information that is encapsulated in an LAPD.

After the optical signal is received, the DCC channel and the LAPD are terminated in step 812, and the message encapsulated in the LAPD is retrieved. It should be appreciated that terminating the DCC channel generally results in the termination of the LAPD, i.e., a process used to terminate the DCC channel generally causes the LAPD to be terminated as well. Upon terminating the DCC channel, the signal without the terminated DCC channel, i.e., the signal which no longer includes a DCC channel, is passed in step 816 to a PPPoE stack, or a layer which is associated with a PPPoE protocol, for forwarding to the external router. The signal without the terminated DCC channel also does not include LAPD encapsulation. Once the signal with the terminated DCC channel is passed to a PPPoE stack, the process of operating a network element is completed.

Figure 9:
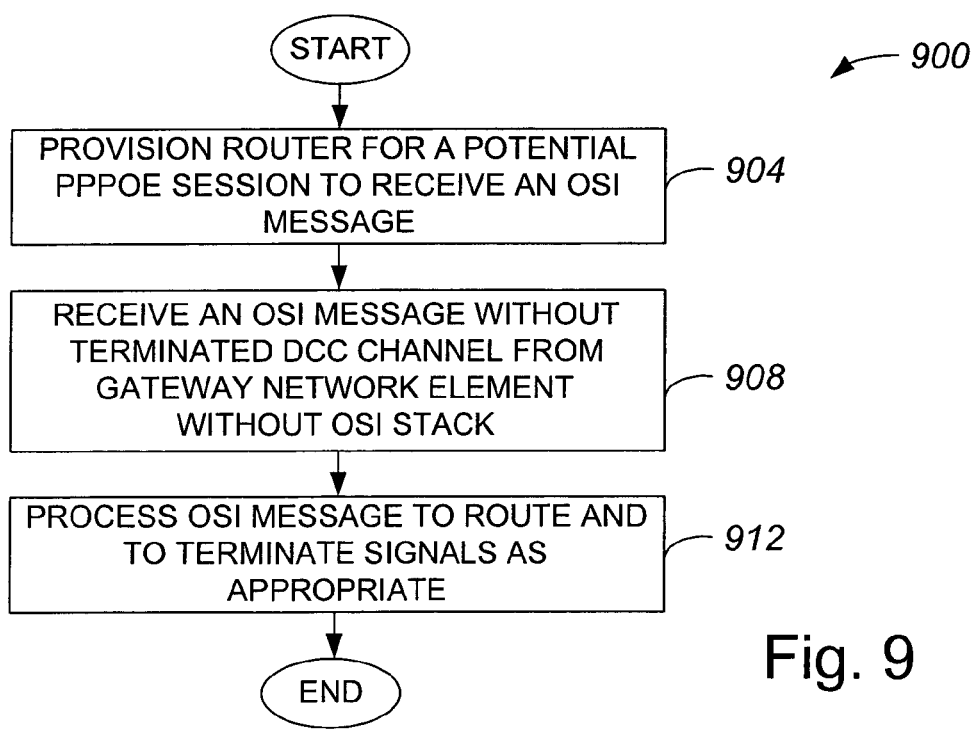
FIG. 9 is a process flow diagram which illustrates the steps associated with the operation of an external router which may accept OSI messages from a network element without an OSI stack will be described in accordance with an embodiment of the present invention.

A signal without a terminated DCC channel, or an OSI message which does not include a DCC channel or LAPD encapsulation, is typically forwarded by an appropriately provisioned port of a network element to a similarly provisioned port of an external router, as mentioned above. FIG. 9 is a process flow diagram which illustrates the steps associated with the operation of an external router which may accept OSI messages from a network element without an OSI stack will be described in accordance with an embodiment of the present invention. A process 900 of operating an external router begins at step 904 in which the router is provisioned to support a PPPoE session, and to receive an OSI message during the PPPoE session. Once the router is provisioned, an OSI message without a terminated DCC channel is received, e.g., from a gateway network element without an OSI stack, in step 908.

Upon receiving the OSI message without the terminated DCC channel, the external router processes the OSI message in order to route and to terminate portions of signals as appropriate in step 912. In general, some signals may be terminated by the external router, while others may be forwarded to an intended destination. After the OSI message without the terminated DCC channel is processed, the process of operating an external router to accept OSI messages from a network element without an OSI stack is completed.

Figure 10:
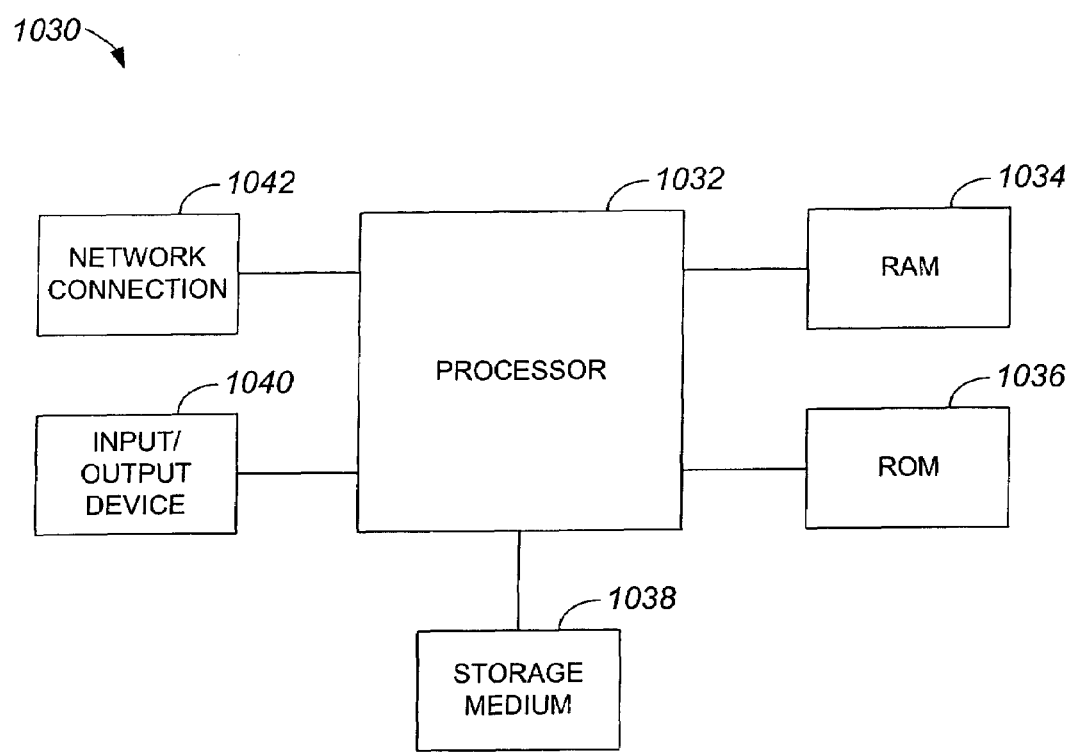
FIG. 10 illustrates a typical, general purpose computing device or computer system suitable for implementing the present invention.

FIG. 10 illustrates a typical, general purpose computing device or computer system suitable for implementing the present invention. A computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM). ROM acts to transfer data and instructions uni-directionally to the CPU 1032, while RAM is used typically to transfer data and instructions in a bi-directional manner.

CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1042. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, the use of an external router to cooperate with a gateway network element without an OSI stack has generally been described as being suitable for use within a SONET network. However, an external router may be used in conjunction with a gateway network element in substantially any suitable network. Other suitable networks include, but are not limited to, synchronous digital hierarchy (SDH) networks.

A gateway network element without an OSI stack may generally have any stacks associated with any other type of network protocol. Various network protocols and, hence, network protocol stacks may generally be created by different manufactures. One particularly common network protocol is an IP protocol. Hence, a gateway network element without an OSI stack may be, in one embodiment, a gateway network element with an IP stack.

An external router that is positioned within a customer network may be positioned substantially anywhere within the customer network, and is in communication with a customer management system associated with the customer network. Typically, the external router is positioned at or near a point-of-entry to the customer network.

In general, a gateway network element which does not have an OSI stack may be substantially any suitable optical network element. By way of example, optical network elements such as the ONS15454 and the ONS15600 optical elements available from Cisco Systems, Inc. of San Jose, Calif. may be used in conjunction with a router to provide substantially seamless management of third-party DCC channels when the optical network elements effectively transmit information contained in the DCC channels over a single shared Ethernet bus. Such SONET network elements effectively become gateway network elements for a variety of third-party network elements.

While a "layer 2" protocol running over a DCC channel has generally been described as being terminated by a network element which does not have an OSI stack, and information associated with a "layer 3" protocol and above is typically passed into a PPPoE session for additional processing by an external router, it should be appreciated that the processing of information associated with a "layer 3" protocol and above may be widely varied. Additionally, the "layer 2" protocol running over the DCC channel may not necessarily be terminated in order to obtain management information for forwarding to an external router. By way of example, there may be no need to terminate the "layer 2" protocol if there is no support in the router for sending LAPD over PPPoE packets.

The steps associated with the various methods of the present invention may be altered, reordered, added, and removed without departing from the spirit or the scope of the present invention. Therefore, the present examples are to be considered as illustrative and not restrictive, and the invention is not to be limited to the details given herein, but may be modified within the scope of the appended claims.

What is claimed is:

1. An optical network system comprising:
    a first network element, the first network element having a stack associated with an OSI protocol and not an IP protocol, the first network element being arranged to send an optical signal compliant with said OSI protocol and including at least one DCC (Data Communication Channel), the DCC being arranged to contain information including a link access protocol on a D channel (LAPD) encapsulated message;
    a second network element, the second network element having a stack associated with the IP protocol and not the OSI protocol, the second network element being arranged to receive the optical signal compliant with the OSI protocol and including the at least one DCC, the second network element further being arranged to extract the information from the LAPD encapsulated message, to terminate the LAPD, and to send without the LAPD the extracted information using a point-to-point-over-Ethernet (PPoE) session and the IP protocol; and
    an external router, the external router being contained within a first portion of the network system, the external router being arranged to cooperate with the second network element to support a point-to-point-over-Ethernet session, the external router being arranged to receive the extracted information from the DCC and to forward the extracted information from the DCC through the first portion of the network system.

2. The optical network system of claim 1 wherein the second network element is a gateway network element, and the external router is located at a point of entry into the first portion of the network.

3. The optical network system of claim 1 wherein the first portion of the network is a customer network, and the first network element and the second network element are not located in the customer network.

4. The optical network system of claim 1 wherein the second network element is a gateway network element.

5. The optical network system of claim 1 wherein the information is management information, the management information being encapsulated in the link access protocol on a D channel (LAPD) message contained in the DCC.

6. The optical network system of claim 5 wherein the second network element terminates the DCC.

7. A gateway network element comprising:
    a first port, the first port being arranged to receive an optical signal including a link access protocol on a D channel (LAPD) encapsulated message from a network element having a stack associated with an OSI protocol and not an IP protocol, wherein the optical signal is compliant with the OSI protocol and the message includes information contained in a DCC (Data Communication Channel), and wherein the gateway network element has a stack associated with the IP protocol and not the OSI protocol;
    a retrieving mechanism, the retrieving mechanism being arranged to extract the information contained in the encapsulated message;
    a terminating mechanism, the terminating mechanism being arranged to terminate the LAPD;
    a second port, the second port being arranged to support a point-to-point-over-Ethernet (PPPoE) session with an external router; and
    a sending mechanism, the sending mechanism being arranged to send the extracted information without the LAPD using the second port, wherein the extracted information is sent using the point-to-point-over-Ethernet (PPoE) session and the IP protocol.

8. The gateway network element of claim 7 wherein the terminating mechanism is arranged to terminate the DCC.

9. The gateway network element of claim 7 wherein the first port is an optical port and the second port is an Ethernet port.

10. The gateway network element of claim 7 wherein the first port is associated with a point-to-point connection.

11. A gateway network element comprising: a first port, the first port being arranged to receive an optical signal including a link access protocol on a D channel (LAPD) encapsulated message from a network element having a stack associated with an OSI protocol and not an IP protocol, wherein the optical signal is compliant with the OSI protocol and the message includes information contained in a DCC (Data Communication Channel), and wherein the gateway network element has a stack associated with the IP protocol and not the OSI protocol;
  a second port, the second port being arranged to support a point-to-point-over-Ethernet (PPPoE) session with an external router; and
  a processor to extract and send information contained in the DCC including:
    software code that cause information contained in the encapsulated message to be extracted;
    software code that cause the LAPD to be terminated;
    software code that cause the extracted information to be sent using the second port, wherein the extracted information is sent without the LAPD using the point-to-point-over-Ethernet (PPoE) session and the IP protocol; and
  a memory that stores the software codes.

12. The gateway network element of claim 11 wherein the processor further includes:
  software code that cause the DCC to be terminated.

13. The gateway network element of claim 11 wherein the first port is an optical port and the second port is an Ethernet port.

14. The gateway network element of claim 11 wherein the first port is associated with a point-to-point connection.

15. A gateway network element comprising:
  a first port, the first port being arranged to receive an optical signal including a link access protocol on a D channel (LAPD) encapsulated message from a network element having a stack associated with an OSI protocol and not an IP protocol, wherein the optical signal is compliant with the OSI protocol and the message includes information contained in a DCC (Data Communication Channel), and wherein the gateway network element has a stack associated with the IP protocol and not the OSI protocol;
    means for extracting the information contained in the encapsulated message: means for terminating the LAPD:,
  a second port, the second port being arranged to support a point-to-point-over-Ethernet (PPPoE) session with an external router; and
  means for sending the extracted information using the second port, wherein the extracted information is sent without the LAPD using the point-to-point-over-Ethernet (PPoE) session and the IP protocol.

16. The gateway network element of claim 15 further including:
  means for terminating the DCC.

17. A method for processing an optical signal received from an optical network element with an OSI stack, the method comprising:
  receiving the optical signal from the optical network element with the OSI stack at a network element without the OSI stack and with an IP stack, the optical signal being OSI compliant and including a DCC (Data Communication Channel) which contains an encapsulated message, the encapsulated message including information and being a link access protocol on a D channel (LAPD) encapsulated message;
  extracting the information from the encapsulated message;
  terminating usage of the link access protocol (LAPD) for the received optical signal; and sending the extracted information without the link access protocol (LAPD) using a point-to-point-over-Ethernet (PPPoE) session and a IP protocol.

18. The method of claim 17 wherein terminating the LAPD includes terminating the DCC.

19. The method of claim 17 wherein the information is management information; and
  wherein the signal is received on a point-to-point connection associated with an optical port.

20. The method of claim 17 wherein sending the information using the point-to-point-over-Ethernet (PPPoE) session includes passing the information to a PPPoE stack for forwarding.

21. A router, the router being arranged to process an optical signal received from an optical network element with an OSI stack, the router comprising:
  a processor to extract and send information, wherein the router lacks the OSI stack and includes an IP stack, and said processor includes:
    software code that causes the reception of the optical signal, the optical signal being OSI-compliant and including a DCC (Data Communication Channel) which contains an encapsulated message, the encapsulated message including information and being a link access protocol on a D channel (LAPD) encapsulated message;
    software code that causes the extraction of the information from the encapsulated message;
    software code that causes the termination of usage of the link access protocol (LAPD) for the received optical signal;
    software code that causes the transmission of the information without the link access protocol (LAPD) using a point-to-point-over-Ethernet (PPPoE) session and a IP protocol; and
  a memory that stores the software codes.

22. The router of claim 21 wherein the software code that causes the termination of the LAPD causes the termination of the DCC.

23. The router of claim 21 wherein the information without the LAPD is management information; and
  wherein the signal is received on a point-to-point connection associated with an optical port.

24. The router of claim 21 wherein the software code that causes the transmission of the information using the point-to-point-over-Ethernet (PPPoE) session causes the passing of the information to a PPPoE stack for forwarding.

* * * * *

UNITED STATES PATENT AND TRADEMARK OFFICE
CERTIFICATE OF CORRECTION

PATENT NO. : 7,627,000 B2  Page 1 of 1
APPLICATION NO. : 10/933004
DATED : December 1, 2009
INVENTOR(S) : Buckles et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1491 days.

Signed and Sealed this

Twenty-first Day of December, 2010

David J. Kappos
*Director of the United States Patent and Trademark Office*